US009655390B2

(12) United States Patent
Davis (10) Patent No.: US 9,655,390 B2
(45) Date of Patent: May 23, 2017

(54) WEARABLE PEDESTRIAN SAFETY RADAR SYSTEM

(71) Applicant: Donnell A. Davis, Bowie, MD (US)

(72) Inventor: Donnell A. Davis, Bowie, MD (US)

( * ) Notice: Subject to any disclaimer, the term of this patent is extended or adjusted under 35 U.S.C. 154(b) by 422 days.

(21) Appl. No.: 14/280,843

(22) Filed: May 19, 2014

(65) Prior Publication Data

US 2015/0332563 A1 Nov. 19, 2015

(51) Int. Cl.
*G01S 13/58* (2006.01)
*A41D 13/01* (2006.01)
*G08B 5/00* (2006.01)
*G06K 9/00* (2006.01)
*G06K 9/32* (2006.01)
*G01S 19/13* (2010.01)
*G01S 7/04* (2006.01)
*G01S 7/00* (2006.01)
*G01S 13/92* (2006.01)
*G08G 1/052* (2006.01)
*G08G 1/16* (2006.01)
(Continued)

(52) U.S. Cl.
CPC .............. *A41D 13/01* (2013.01); *G01S 7/003* (2013.01); *G01S 7/04* (2013.01); *G01S 13/58* (2013.01); *G01S 13/92* (2013.01); *G01S 19/13* (2013.01); *G06K 9/00671* (2013.01); *G06K 9/3258* (2013.01); *G08B 5/004* (2013.01); *G08B 5/006* (2013.01); *G08G 1/052* (2013.01); *G08G 1/166* (2013.01); *G01S 2007/027* (2013.01); *H02J 7/0044* (2013.01); *H02J 7/35* (2013.01)

(58) Field of Classification Search
CPC ........ A41D 13/01; G08G 1/166; G08G 1/052; G01S 13/92; G01S 7/003; G01S 19/13; G01S 7/04; G01S 13/58; G01S 2007/027; G06K 9/00671; G06K 9/3258; G08B 5/004; G08B 5/006; H02J 7/35
USPC .............................. 342/66, 104, 20; 340/936
See application file for complete search history.

(56) References Cited

U.S. PATENT DOCUMENTS 4,709,307 A 11/1987 Branom
4,725,840 A * 2/1988 Orazietti ................. G01S 7/022
342/20
(Continued)

FOREIGN PATENT DOCUMENTS

CA 1187601 A * 5/1985 ........... H01Q 1/3266
CN 2574067 Y * 9/2003
(Continued)

*Primary Examiner* — John B Sotomayor
(74) *Attorney, Agent, or Firm* — Stevenson IP, LLC (57) ABSTRACT

A wearable pedestrian safety radar system including a harness with a pocket and a portable radar speed detection and display device to be worn on the front and back of the harness by a pedestrian while on a roadway. The device includes a radar system, LED lights, a microcontroller, a proximity sensor, a camera, a strobe light, an audible alert unit and a vibration unit. The device detects a speed of an on-coming motor vehicle. If the vehicle is exceeding a predetermined speed limit, the speed is displayed on the device. If the vehicle does not slow down below the speed limit within a distance detected by the proximity sensor, the camera records the vehicle while the strobe light blinks to warn the driver of the recording. The audible alert unit and vibration unit alert the pedestrian. The system may be used to relay data to a law enforcement agency.

2 Claims, 6 Drawing Sheets

(51) Int. Cl.
 *H02J 7/35* (2006.01)
 *G01S 7/02* (2006.01)
 *H02J 7/00* (2006.01)

(56) References Cited

U.S. PATENT DOCUMENTS

| | | | | |
|---|---|---|---|---|
| 6,046,686 | A * | 4/2000 | Mitchell | G08G 1/052 340/905 |
| 6,606,033 | B1 * | 8/2003 | Crocker | G06Q 30/02 340/438 |
| 6,731,202 | B1 * | 5/2004 | Klaus | B60Q 1/525 340/425.5 |
| 7,737,912 | B2 * | 6/2010 | Graef | G09F 9/30 345/1.1 |
| 7,886,368 | B2 * | 2/2011 | Hood | A41D 1/002 2/102 |
| 7,978,097 | B2 | 7/2011 | Arenburg et al. | |
| 8,344,864 | B1 * | 1/2013 | Al-Mutawa | B60W 50/12 340/435 |
| 8,373,588 | B2 | 2/2013 | Kuhn | |
| 9,102,220 | B2 * | 8/2015 | Breed | B60R 21/0132 |
| 9,286,794 | B2 * | 3/2016 | Duncan | G08G 1/005 |
| 9,387,897 | B2 * | 7/2016 | Orzeck | B62J 3/00 |
| 2002/0189000 | A1 * | 12/2002 | Jordan | A41D 1/005 2/102 |
| 2004/0083035 | A1 * | 4/2004 | Ellis | A61H 3/061 701/1 |
| 2004/0145496 | A1 * | 7/2004 | Ellis | A61H 3/061 340/905 |
| 2004/0257245 | A1 * | 12/2004 | Jo | G08G 1/052 340/936 |
| 2005/0035878 | A1 * | 2/2005 | Vassilevsky | G08G 1/0965 340/902 |
| 2007/0290886 | A1 * | 12/2007 | Stam | B60Q 9/00 340/907 |
| 2008/0169970 | A1 * | 7/2008 | Woodcox | G01S 7/003 342/113 |
| 2009/0160678 | A1 * | 6/2009 | Turnbull | B60Q 1/525 340/944 |
| 2013/0058623 | A1 * | 3/2013 | Olson | H04N 5/765 386/230 |
| 2013/0141576 | A1 * | 6/2013 | Lord | G08G 1/04 348/148 |
| 2013/0142347 | A1 * | 6/2013 | Lord | H04R 29/005 381/58 |
| 2013/0200991 | A1 * | 8/2013 | Ricci | G08C 19/00 340/4.3 |
| 2013/0239298 | A1 * | 9/2013 | Jordan | A41D 27/201 2/250 |
| 2015/0029051 | A1 * | 1/2015 | Driscoll | G01S 13/74 342/6 |
| 2015/0109148 | A1 * | 4/2015 | Cheatham, III | G08G 1/005 340/944 |
| 2015/0264432 | A1 * | 9/2015 | Cheng | H04N 21/44218 725/10 |
| 2015/0332563 | A1 * | 11/2015 | Davis | G08B 5/006 342/66 |
| 2016/0232770 | A1 * | 8/2016 | Davis | G08B 15/02 |

FOREIGN PATENT DOCUMENTS

| | | | | |
|---|---|---|---|---|
| CN | 102346197 A | * | 2/2012 | |
| CN | 202815217 U | * | 3/2013 | |
| CN | 203299376 U | * | 11/2013 | |
| GB | 9827284 | * | 2/1999 | G01S 17/026 |
| JP | 2000329844 A | * | 11/2000 | |
| JP | 2007004285 A | * | 1/2007 | |
| JP | 2007128235 A | * | 5/2007 | |
| JP | 2013181897 A | * | 9/2013 | |
| RS | WO 2014168499 A1 | * | 10/2014 | G01S 7/032 |

* cited by examiner

WEARABLE PEDESTRIAN SAFETY RADAR SYSTEM

BACKGROUND OF THE INVENTION

Various types of road safety apparel are known in the prior art. However, what is needed is a wearable pedestrian safety radar system including a harness intended to be worn by a pedestrian when traveling on a motorist roadway. The harness incorporates a portable radar detection and display device on the front and the back of the harness which is configured to detect the speed of an on-coming motor vehicle. The system allows for programming of a speed limit. If the vehicle is exceeding the speed limit, the device displays the detected speed value visible on the harness as the motor vehicle approaches the pedestrian. If the vehicle does not reduce to a speed below the speed limit, the device blinks to alert the driver and then records the data and photographs the vehicle. The device also vibrates and makes an audible sound to alert the pedestrian that a speeding vehicle is approaching. The device may be used to relay the recorded data to a law enforcement agency as a police report, to the Department of Motor Vehicle or to the Citizen Vigilant Reporting Reward Program.

FIELD OF THE INVENTION

The present invention relates to road safety apparel, and more particularly, to a wearable pedestrian safety radar system which is a harness intended to be worn by a pedestrian when traveling on a motorist roadway. The wearable pedestrian safety radar system incorporates a portable radar detection and display device configured to detect and display the speed of an on-coming motor vehicle and record and store data for relay to a law enforcement agency as a police report, to a motor vehicle registration agency or to the Vehicle or to the Citizen Vigilant Reporting Reward Program.

SUMMARY OF THE INVENTION

The general purpose of the present wearable pedestrian safety radar system, described subsequently in greater detail, is to provide a wearable pedestrian safety radar system which has many novel features that result in a wearable pedestrian safety radar system which is not anticipated, rendered obvious, suggested, or even implied by prior art, either alone or in combination thereof.

To accomplish this, the present wearable pedestrian safety radar system includes a harness configured to be worn by a pedestrian which incorporates a portable radar speed detection and display device. The a portable radar speed detection and display device includes a display case, a transparent protective cover, a speed detection and display board, a transparent radiofrequency barrier film, a microcontroller, at least one infrared proximity sensor, a camera, a battery source, at least one solar panel, a vibration unit, an audible alert unit and a micro USB port. The speed detection and display board has a radar system, a plurality of light emitting diodes, and a strobe light. When the pedestrian is on the roadway, the radar system detects the speed of the on-coming motor vehicle and transmits the data to the microcontroller. The microcontroller is disposed within the compartment of the display case. The microcontroller is in operational communication with the radar system, the speed detection and display board and a battery source. The microcontroller operates under control of software and data configured to convert said speed signal into the measured speed of the motor vehicle and to allow programming of a predetermined speed limit determined by US Department of Transportation speed limit signs in the area.

If the motor vehicle is moving at a speed in excess of the predetermined speed limit, the speed is displayed on the portable radar speed detection and display device worn by the pedestrian. The infrared proximity sensor detects the distance between the motor vehicle and the pedestrian and sends a signal to the microcontroller when the motor vehicle is within ten feet of the pedestrian. The vibration unit vibrates and the audible alert unit makes an audible sound to notify the pedestrian of an on-coming speeding motor vehicle. If the if the driver does not adjust the speed below the predefined speed limit as detected by the radar system within the distance of ten feet as detected by the infrared proximity sensor, the microcontroller sends a signal to the LED strobe light and the camera. The camera is configured to automatically record images of the motor vehicle. The strobe light blinks to alert the driver that a photo is being recorded.

The device is also configured with a license plate recognition application to recognize and store a license plate number of the motor vehicle, a global positioning system (GPS) module and geolocation application to determine and record location data, a Bluetooth® module and a Wi-Fi card to allow wireless transmission of data from the microcontroller to an external component such as a personal computer, a cell phone, a smartphone or Google Glass®. The data may be relayed by a to a law enforcement agency as a police report, to a motor vehicle registration agency or to the Citizen Vigilant Reporting Reward Program.

The wearable pedestrian safety radar system may include a transmitter harness, a panel, and a transmitter device. The transmitter harness has a plurality of adjustable straps and a plurality of fasteners. The transmitter harness is configured to be worn on a front side by a pedestrian. The panel is formed of a clear plastic material. The panel includes a camera pocket, a smartphone pocket and a transmitter pocket. The transmitter device includes a pocket radar system, a transmitter camera with a flash and a strobe light. The pocket radar system is configured to detect the speed signal of an on-coming motor vehicle, convert said speed signal into a measured speed value, to allow programming of a predetermined speed limit determined by US Department of Transportation speed limit signs in the area and to allow transmission of data. The transmitter camera with a flash is in operational communication with the pocket radar system. Upon failure of the on-coming vehicle to reduce the speed below the predetermined speed limit as detected by the pocket radar system, the transmitter camera with a flash automatically records images of the on-coming motor vehicle. The strobe light blinks to notify the on-coming driver that a photograph is being recorded. The transmitter includes a camera shutter button which enables the pedestrian to manually photograph a speeding on-coming motor vehicle. The transmitter is configured to transmit data to the existing smartphone. The data may be relayed to a law enforcement agency as a police report, to a motor vehicle registration agency or to the Citizen Vigilant Reporting Reward Program.

Thus has been broadly outlined the more important features of the present wearable pedestrian safety radar system so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

With reference now to the drawings, and in particular FIGS. 1 through 6 thereof, an example of the instant wearable pedestrian safety radar system employing the principles and concepts of the present wearable pedestrian safety radar system and generally designated by the reference number 10 will be described.

Referring to FIGS. 1 through 6 the present wearable pedestrian safety radar system 10 is illustrated. The wearable pedestrian safety radar system 10, includes a harness 20 configured to be worn by a pedestrian. The harness 20 has a plurality of adjustable belts 21 and a plurality of buckles 22, a front side 23 and a back side 24. A pocket 26 is disposed on each of the front side 22 and the back side 24. The pocket 26 of the harness 20 is formed of a clear plastic material to allow the device 10 to be seen by a driver of an on-coming motor vehicle.

The system 10 also includes a portable radar speed detection and display device 30 configured to detect a speed of an on-coming motor vehicle, to convert said speed signal into a measured speed value, and to display the measured speed value.

Figure 3:
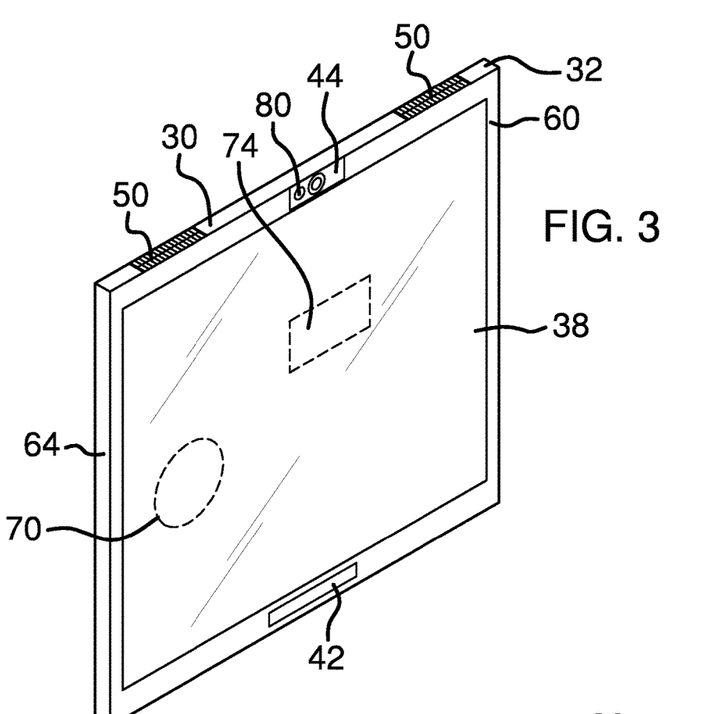
FIG. 3 is an isometric view of a portable radar speed detection and display device.
Figure 4:
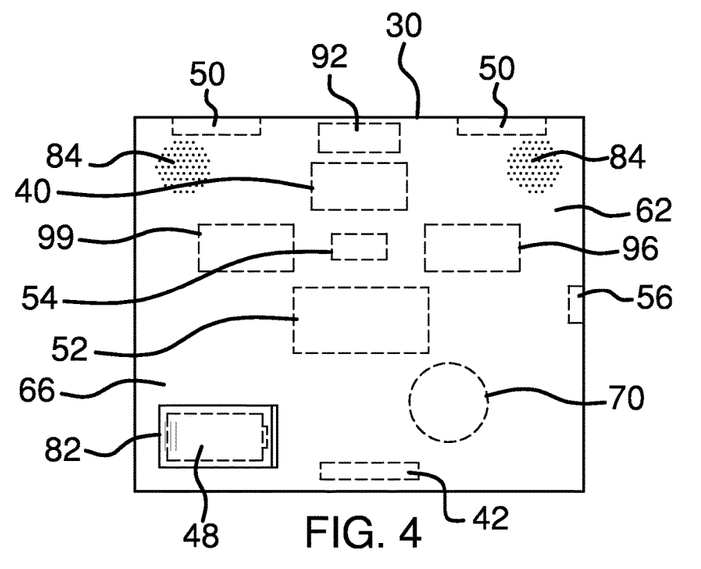
FIG. 4 is a rear elevation view of the portable radar speed detection and display device.
Figure 5:
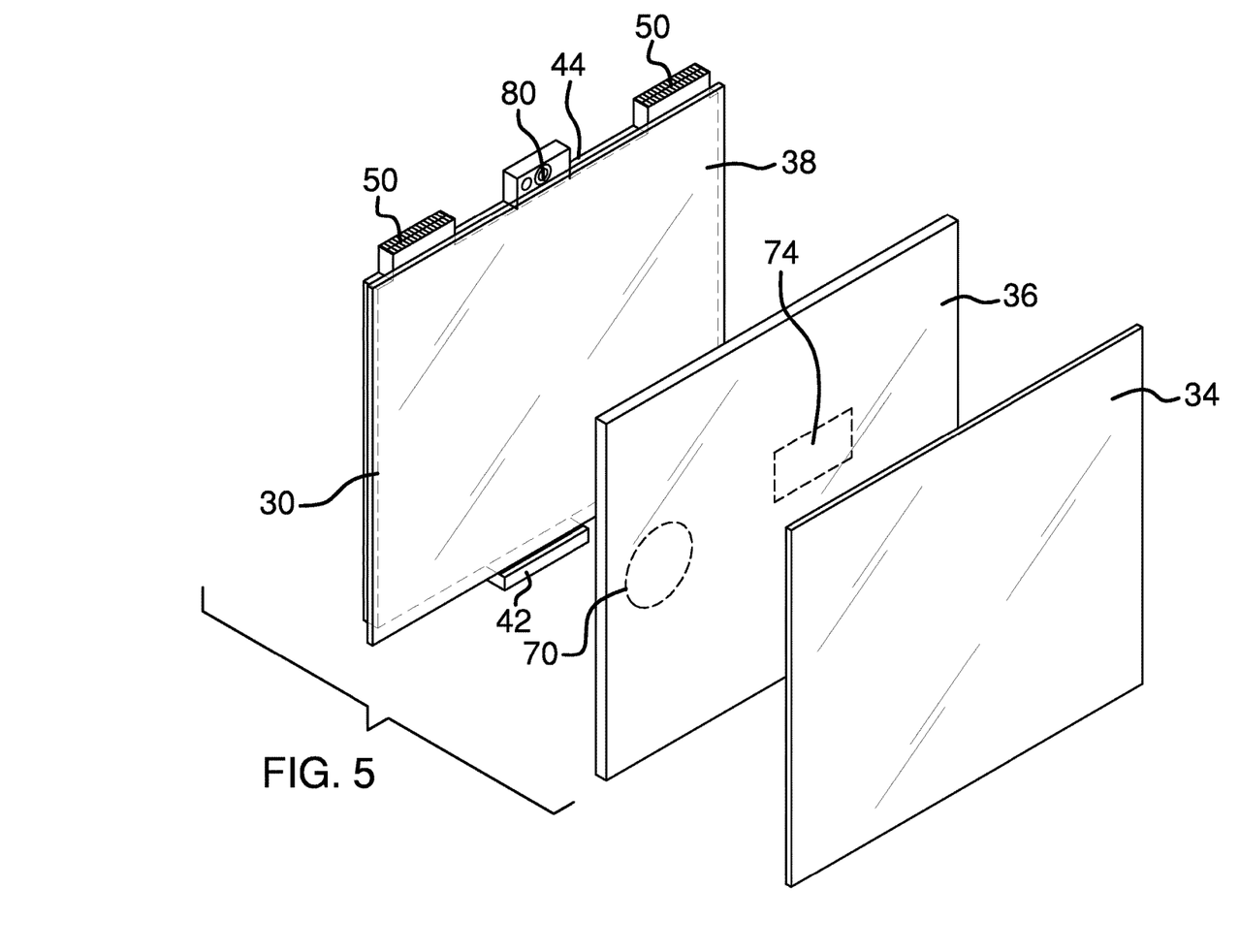
FIG. 5 is an exploded view of the portable radar speed detection and display device.

The portable radar speed detection and display device 30 includes a display case 32, a transparent protective cover 34, a speed detection and display board 36, a transparent radiofrequency barrier film 38, a microcontroller 40, at least one infrared proximity sensor 42, a camera 44, a battery source 48, at least one solar panel 50, a vibration unit 52, an audible alert unit 54 and a micro USB port 56. The display case 32 has an open front side 60, a solid back side 62, a solid continuous outer side 64 and a compartment 66 therein. The transparent, protective cover 34 is configured to protect the portable radar speed detection and display device 30 from damage. The transparent radiofrequency barrier 38 film is configured to block RF energy.

The speed detection and display board 36 has a radar system 70, a plurality of light emitting diodes (LEDs) 72, and a strobe light 74. The radar system 70 is disposed on the speed detection and display board 36, the radar system 70 is configured to detect the speed signal of the on-coming motor vehicle. The radar system 70 can employ Doppler radar or pulse-Doppler radar technology to improve the accuracy of the radar system. The LEDs 72 are disposed within the speed detection display board 36. The LEDs 72 are configured to display speeds detected by the radar system 70. Wherein upon detection of the speed of the on-coming motor vehicle at a value exceeding the predetermined speed limit, the microcontroller sends a signal to the LEDs 72 to display the speed of the on-coming motor vehicle. The strobe light 74 is configured to blink to alert the driver of excess speed.

The microcontroller 40 is disposed within the compartment 66 of the display case 32. The microcontroller 40 is in operational communication with the speed detection and display board 36 and the battery source 48. The microcontroller 40 operates under control of software and data configured to convert said speed signal into the measured speed of the motor vehicle and to allow programming of a predetermined speed limit determined by US Department of Transportation speed limit signs in the area.

The infrared proximity sensor 42 is disposed within the compartment 66 of the display case 32. The infrared proximity sensor 42 is in operational communication with the microcontroller 40 and the battery source 48, the infrared proximity sensor 40 is configured detect a distance between the oncoming motor vehicle and the pedestrian and to send a distance signal to the microcontroller 40 when the on-coming motor vehicle is within ten feet of the pedestrian.

The camera 44 is disposed within the compartment 66 of the display case 32. The camera 44 has a flash 80. The camera 44 is in operational communication with the microcontroller 40 and the battery source 48. Whereupon upon failure of the on-coming motor vehicle to reduce the speed below the predetermined speed limit as detected by the radar system 70 within the distance of ten feet as detected by the infrared proximity sensor 40, the camera 44 is configured to automatically record images of the on-coming motor vehicle.

The battery source 48 is disposed within a battery compartment 82 disposed within the compartment 66 of the display case 32. The battery source 48 is in operational communication with the speed detection and display board 36, the microcontroller 40, the camera 44, the infrared proximity sensor 42, the vibration unit 52, the audible alert unit 54, and the micro USB port 56.

At least one solar panel 50 is disposed atop the compartment 66 of the display case 32. The solar panel 50 is in operational communication with the battery source 48. The solar panel is 50 configured to charge the battery source 48.

The vibration unit 52 is disposed within the compartment 66 of the display case 32. The vibration unit 52 is in operational communication with the microcontroller 40 and the battery source 48. The vibration unit 52 is configured to vibrate to notify the pedestrian of an on-coming speeding motor vehicle.

The audible alert unit 54 has a pair of speakers 84 disposed within the compartment the compartment 66 of the display case 32. The audible alert unit 54 is in operational communication with the microcontroller 40 and the battery source 48. The audible alert unit 54 is configured audibly alert the pedestrian of an on-coming speeding motor vehicle.

The micro USB port 56 is disposed within the compartment 66 of the display case 32. The micro USB port 56 configured to receive a USB cable.

Figure 6:
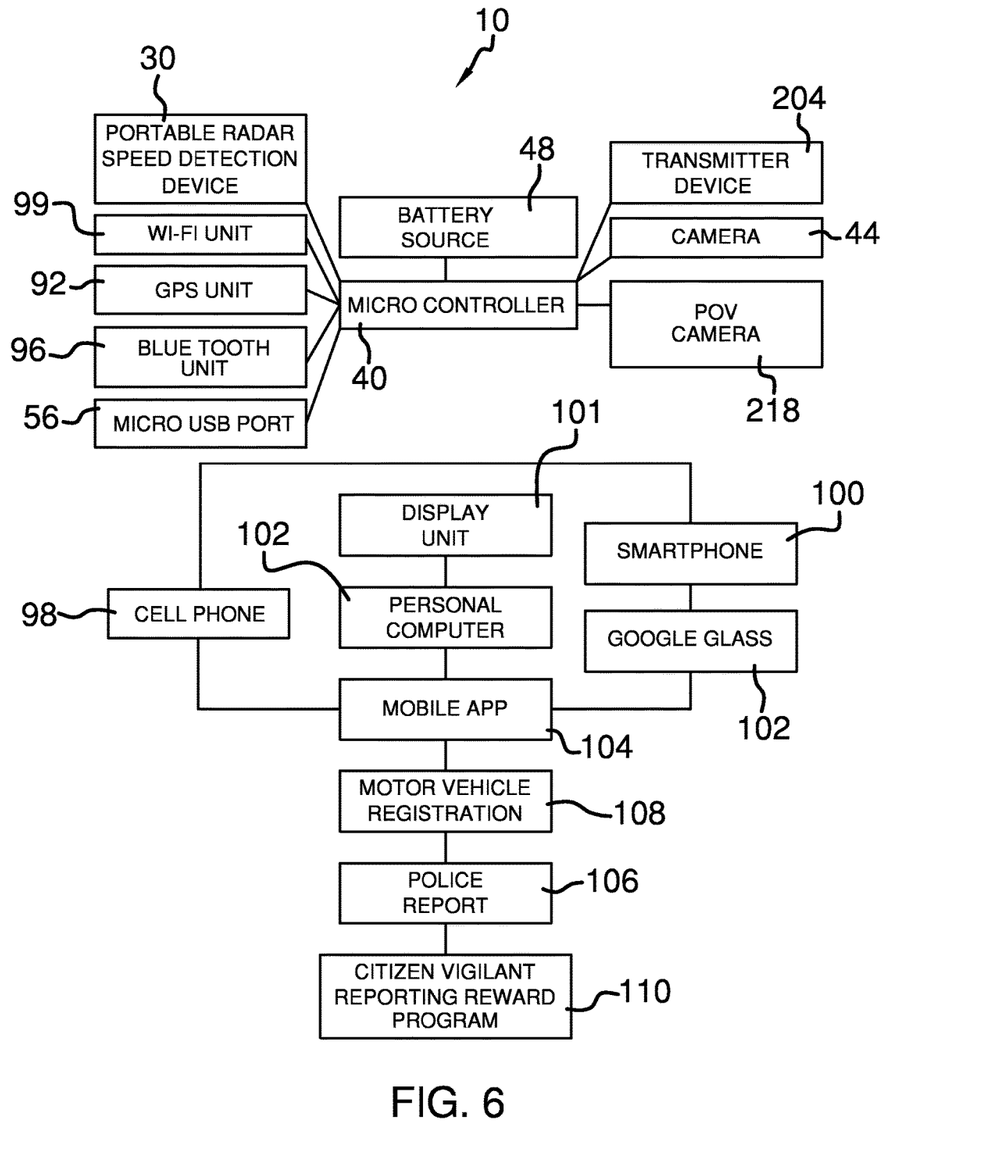
FIG. 6 is a block diagram of operations.

A license plate recognition application 90, which is in operational communication with the microcontroller 40, recognizes and stores a license plate number of the motor vehicle. A global positioning system (GPS) module 92, disposed within the compartment 66, is in operational communication with the microcontroller 40. The GPS module 92 determines and records location data. A geolocation application 94, which is in operational communication with the GPS module 92 and the microcontroller 40, determines and records street location data. A Bluetooth® module 96, disposed within the compartment 66, allows wireless transmission of signals between the components of the portable radar speed detection and display device and alternately to external components, such as a cell phone 98, smartphone 100 or Google Glass® 102. A Wi-Fi module 99, disposed within the compartment 66, allows wireless transmission of data from the microcontroller 40 to an external component, such as a display unit 101 or personal computer 102. Data received and stored by the microcontroller 40 can be relayed by an existing mobile application 104 to a law enforcement agency as a police report 106, to the Department of Motor Vehicles 108, or to the Citizen Vigilant Reporting Reward Program 110.

Figure 1:
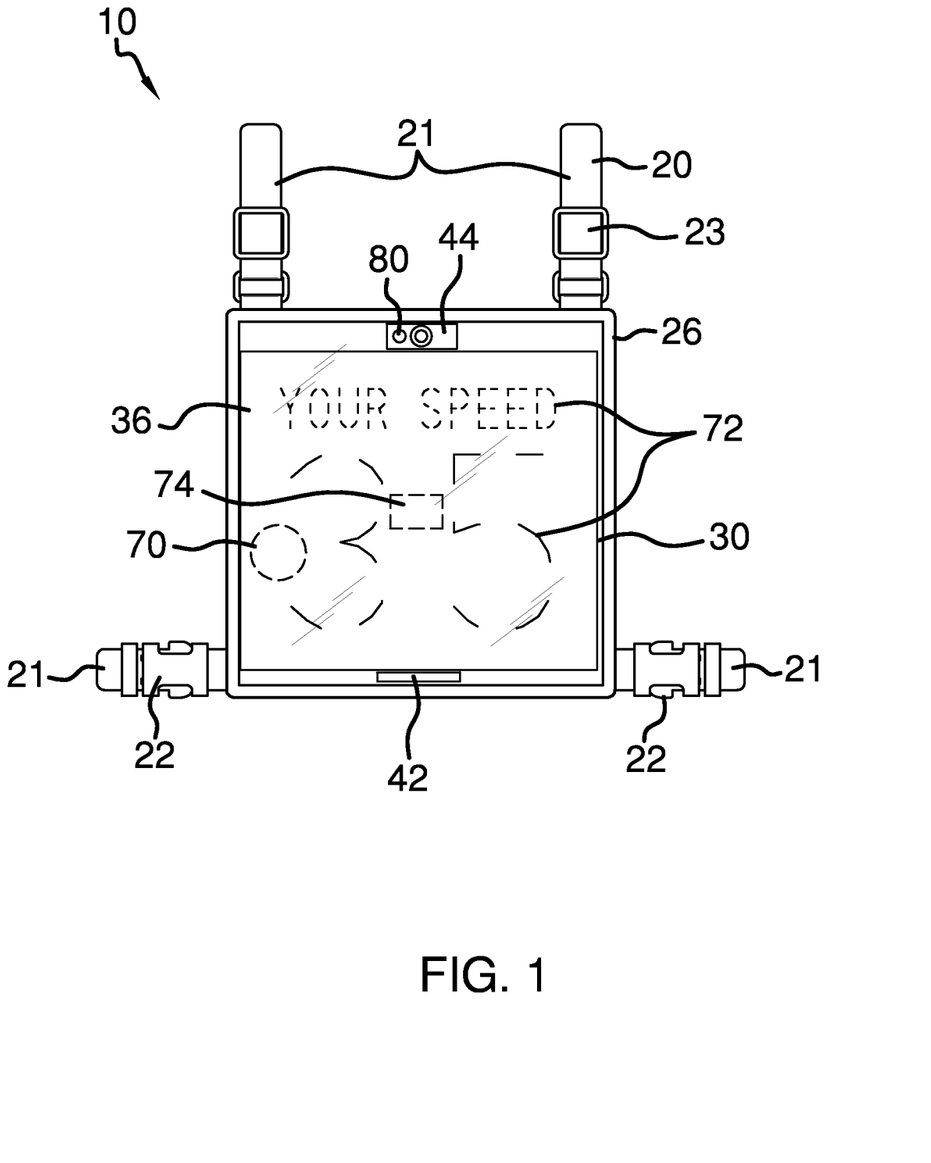
FIG. 1 is a front elevation view.
Figure 1A:
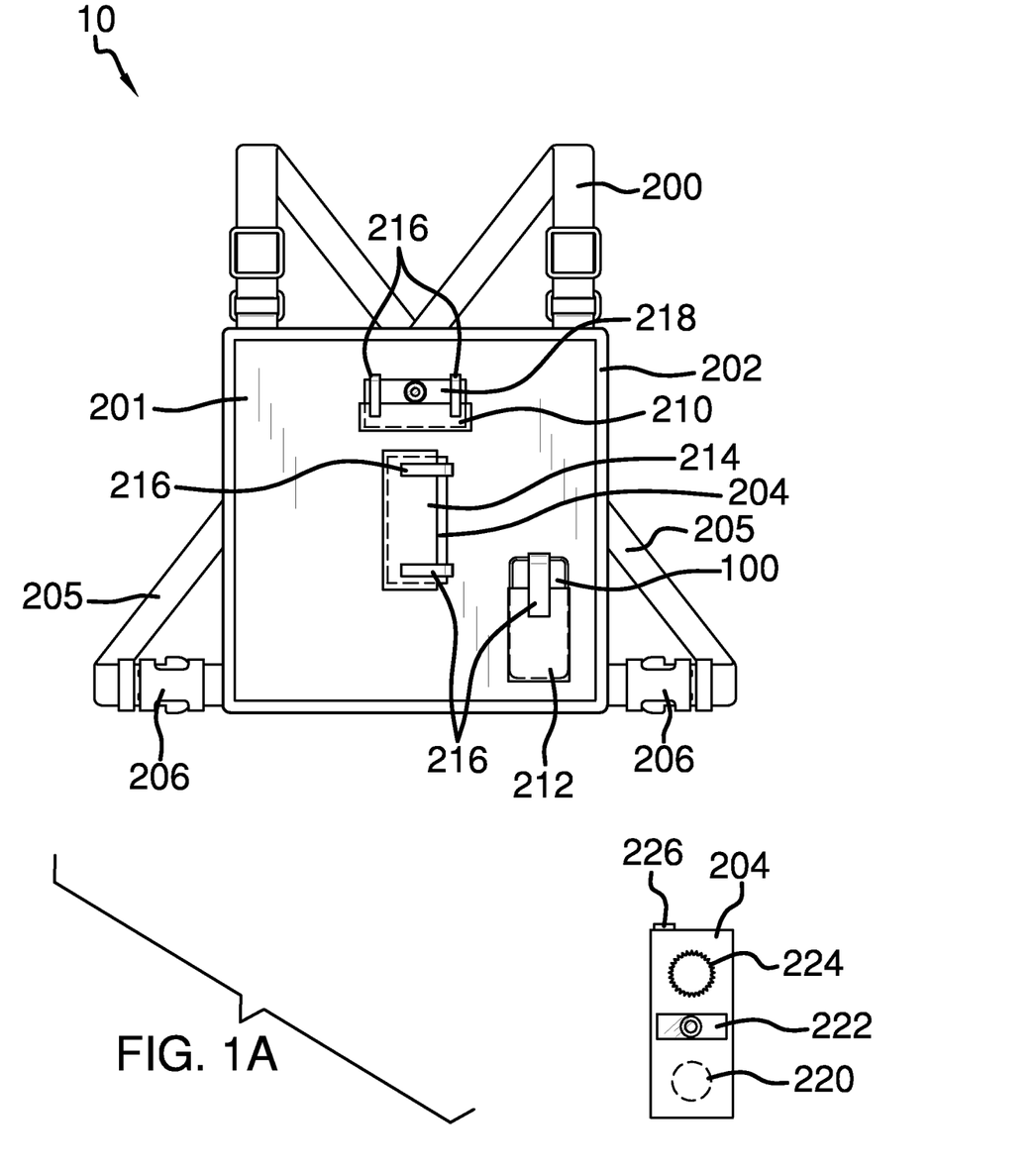
FIG. 1A is a front exploded view showing a separate transmitter device which removably engages a transmitter pocket.
Figure 2:
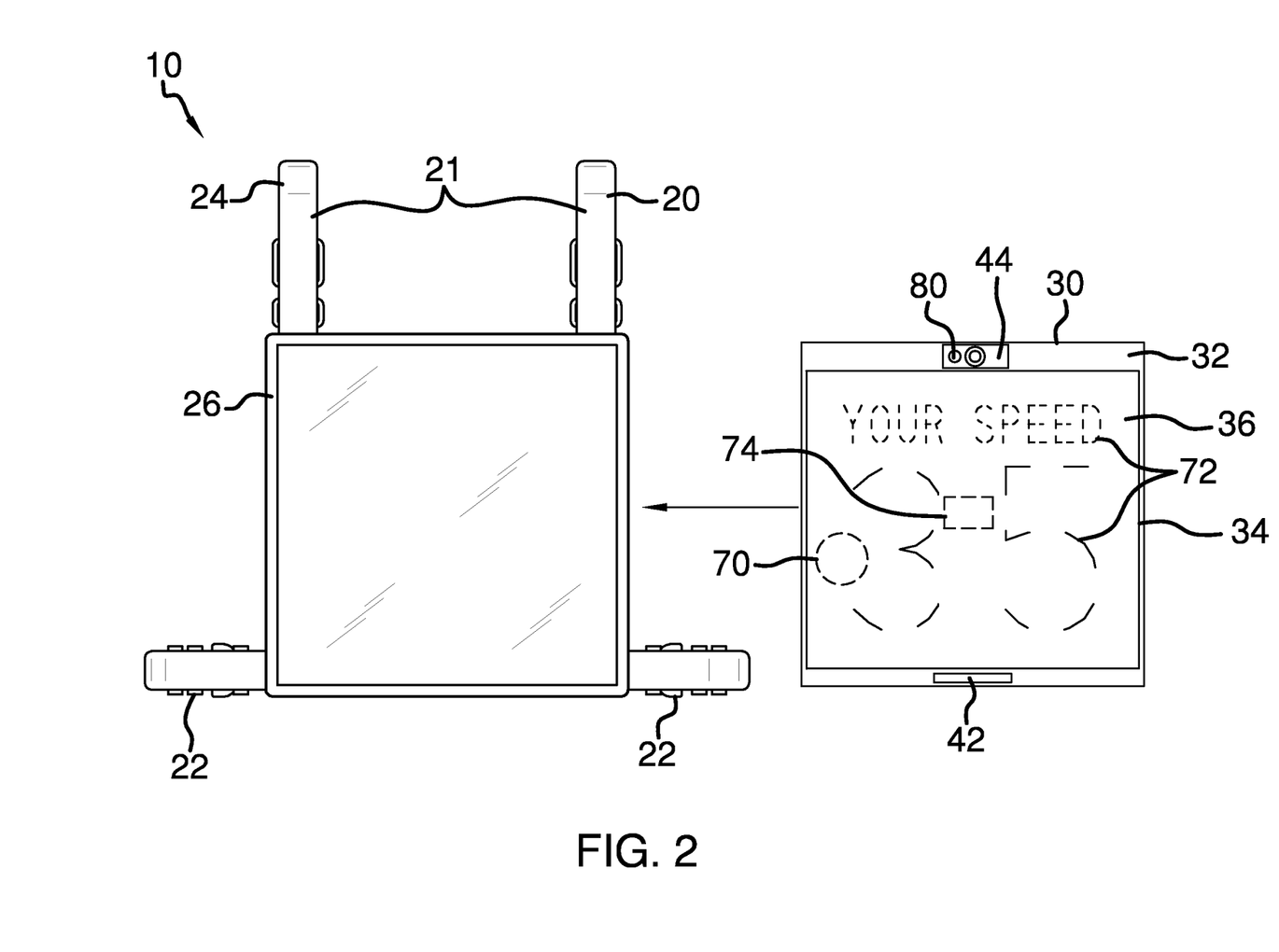
FIG. 2 is rear elevation view.

The wearable pedestrian safety radar system 10 may include a transmitter harness 200, a panel 202, and a transmitter device 204. The transmitter harness 200 has a plurality of adjustable straps 205 and a plurality of fasteners 206. The transmitter harness 200 is configured to be worn by a pedestrian. The panel 202 is disposed on a front side 201 of the transmitter harness 200. The panel 202 is formed of a clear plastic material. The panel 202 includes a camera pocket 210, a smartphone pocket 212 and a transmitter pocket 214. Each of the camera pocket 210, smartphone pocket 212 and transmitter pocket 214 includes at least one pocket strap 216 configured to removably hold the respective devices in place. The camera pocket 210 is configured to hold an existing point of view camera 218. The smartphone pocket is configured to hold an existing smartphone 100.

The transmitter device 204 is removably disposed within the transmitter pocket 214. The transmitter device 204 includes a pocket radar system 220, a transmitter camera with a flash 222, a strobe light 224 and a shutter button 226. The pocket radar system 220 is configured to detect the speed signal of an on-coming motor vehicle, convert said speed signal into a measured speed value, and to allow programming of a predetermined speed limit determined by US Department of Transportation speed limit signs in the area. The pock radar system 220 may use Doppler radar technology. The transmitter camera with flash 222 is in operational communication with the pocket radar system 220. Upon failure of the on-coming vehicle to reduce the speed below the predetermined speed limit as detected by the pocket radar system 220, the transmitter camera with a flash 222 is configured to automatically record images of the on-coming motor vehicle. The strobe light 224 is in operational communication with the pocket radar system 220. The strobe light 224 is configured to blink to notify the on-coming driver that a photograph is being recorded. The shutter button 226 is disposed on the transmitter device and is in operational communication with the transmitter camera with flash 222. The shutter button 226 is configured to enable the pedestrian to manually photograph a speeding on-coming motor vehicle. The pocket radar system 220 and the camera are configured to transmit data to the existing smartphone 100. The data may be relayed by an existing mobile application 104 to a law enforcement agency as a police report 106, to a vehicle registration agency 108, or to the Citizen Vigilant Reporting Reward Program 110.

What is claimed is:

1. A wearable pedestrian safety radar system comprising:
   a harness having a plurality of adjustable belts and a plurality of buckles, the harness having a front side and a back side, the harness configured to be worn by a pedestrian;
   a pocket disposed on each of the front side and the back side, the pocket being formed of a clear plastic material;
   a portable radar speed detection and display device removably disposed within the pocket, the portable radar speed detection and display device configured to detect the speed signal of an on-coming motor vehicle, convert said speed signal into a measured speed value, and display the measured speed value;
   wherein the pocket of the harness is configured to allow the display to be seen by a driver of an on-coming motor vehicle;
   a display case having an open front side, a solid back side, a solid continuous outer side and a compartment therein;
   a transparent, protective cover configured to protect the display device from damage;
   a speed detection and display board having a radar system, a plurality of light emitting diodes, and a strobe light;
   wherein the radar system is disposed on the speed detection and display board, the radar system being configured to detect the speed signal of the on-coming motor vehicle;
   wherein the LEDs are disposed within the speed detection and display board, the LEDs configured to display speeds detected by the radar system on the front side of the display panel, wherein upon the detection of the speed of the on-coming motor vehicle at a value exceeding the predetermined speed limit, the microcontroller sends a signal to the LED lights to display the speed of the on-coming motor vehicle;
   wherein the strobe light is configured to blink to alert the driver of excess speed;
   a transparent radiofrequency barrier film configured to block RF energy;
   a microcontroller disposed within the compartment, the microcontroller being in operational communication with the speed detection and display board and a battery source, the microcontroller operating under control of software and data configured to convert said speed signal into the measured speed of the on-coming motor vehicle and to allow programming of a predetermined speed limit determined by US Department of Transportation speed limit signs in the area;
   at least one infrared proximity sensor disposed within the compartment in operational communication with the microcontroller and the battery source, the infrared proximity sensor configured detect a distance between the oncoming motor vehicle and the pedestrian and to send a distance signal to the microcontroller when the on-coming motor vehicle is within ten feet of the pedestrian;
   a camera disposed within the compartment, the camera having a flash, the camera being in operational communication with the microcontroller and the battery source, whereupon upon failure of the on-coming motor vehicle to reduce the speed below the predetermined speed limit as detected by the radar system within the distance of ten feet as detected by the infrared proximity sensor, the camera is configured to automatically record images of the motor vehicle;
   a battery source disposed within a battery compartment, the battery compartment disposed within the compartment of the display case, the battery source being in operational communication with the radar system, the microcontroller, the camera, the infrared proximity sensor, the LED strobe light, and the vibration unit;

at least one solar panel disposed on top of the compartment, the solar panel in operational communication with the battery source, the solar panel configured to charge the battery source;

a vibration unit disposed within the compartment, the vibration unit being in operational communication with the microcontroller and the battery source, the vibration unit configured to vibrate to notify the pedestrian of an on-coming speeding motor vehicle;

an audible alert unit having a pair of speakers disposed within the compartment, the audible alert unit configured audibly alert the pedestrian of an on-coming speeding motor vehicle;

a micro USB port disposed within the compartment, the micro USB port configured to receive a USB cable;

wherein the portable radar speed detection and display device further comprises:

a license plate recognition application in operational communication with the microcontroller, the license plate recognition application configured to recognize and store a license plate number of the motor vehicle;

a global positioning system (GPS) module disposed within the compartment, the GPS in operational communication with the microcontroller, the GPS configured to determine and record location data;

a geolocation application in operational communication with the GPS chip and the microcontroller, the geolocation application configured to determine and record street location data;

a Bluetooth® module disposed within the panel, the Bluetooth® module
configured to allow wireless transmission of signals between the components of the portable radar speed detection and display device and alternatively to external components; and a Wi-Fi card disposed within the compartment, the Wi-Fi card configured to allow wireless transmission of data from the microcontroller to external components;

wherein the system is configured to collect, store and relay data to a law enforcement agency wherein the data may be relayed to a law enforcement agency, a motor vehicle registration agency, or a Citizens Vigilant Reporting Program;

wherein the radar system is a pulse-Doppler radar system.

2. The wearable pedestrian safety radar system of claim 1 wherein the portable radar speed detection and display device comprises:

a license plate recognition application in operational communication with the microcontroller, the license plate recognition application configured to recognize and store a license plate number of the motor vehicle;

a global positioning system (GPS) module disposed within the compartment, the GPS in operational communication with the microcontroller, the GPS configured to determine and record location data;

a geolocation application in operational communication with the GPS chip and the microcontroller, the geolocation application configured to determine and record street location data;

a Bluetooth® module disposed within the panel, the Bluetooth® module configured to allow wireless transmission of signals between the components of the portable radar speed detection and display device and alternatively to external components; and a Wi-Fi card disposed within the compartment, the Wi-Fi card configured to allow wireless transmission of data from the microcontroller to external components.

* * * * *